(12) United States Patent
Thompson et al.

(10) Patent No.: US 12,476,010 B2
(45) Date of Patent: Nov. 18, 2025

(54) NINEPATCH ONEVIEW

(71) Applicant: QS Systems, Inc., Grand Junction, CO (US)

(72) Inventors: Richard Arzt Thompson, Grand Junction, CO (US); Jeffrey Michael Greene, San Francisco, CA (US); Lalo Abelardo Valdez, Milpitas, CA (US); Salim Kizaraly, Milpitas, CA (US); Jason McRoy, Crested Butte, CO (US)

(73) Assignee: NINEPATCH, INC., Dover, DE (US)

( * ) Notice: Subject to any disclaimer, the term of this patent is extended or adjusted under 35 U.S.C. 154(b) by 1027 days.

(21) Appl. No.: 17/244,138

(22) Filed: Apr. 29, 2021

(65) Prior Publication Data

US 2021/0343418 A1 Nov. 4, 2021

Related U.S. Application Data

(60) Provisional application No. 63/018,112, filed on Apr. 30, 2020.

(51) Int. Cl.
*G16H 50/30* (2018.01)
*G06N 5/04* (2023.01)
*G06N 20/00* (2019.01)

(52) U.S. Cl.
CPC ............ *G16H 50/30* (2018.01); *G06N 5/04* (2013.01); *G06N 20/00* (2019.01)

(58) Field of Classification Search
CPC ........ G16H 50/30; G16H 10/60; G16H 15/00; G16H 50/20; G16H 50/70; G16H 40/67; G06N 5/04; G06N 20/00
See application file for complete search history.

(56) References Cited

U.S. PATENT DOCUMENTS

| | | | | |
|---|---|---|---|---|
| 2007/0118399 | A1* | 5/2007 | Avinash | G16H 10/60 705/2 |
| 2010/0225661 | A1* | 9/2010 | Gorisch | G06Q 10/06 345/589 |
| 2016/0110523 | A1* | 4/2016 | Francois | G16H 10/20 705/2 |
| 2016/0210427 | A1* | 7/2016 | Mynhier | G16H 10/60 |
| 2019/0096526 | A1* | 3/2019 | Hirsch | G06F 21/6245 |
| 2021/0118574 | A1* | 4/2021 | Peri | G06F 16/45 |

\* cited by examiner

*Primary Examiner* — Hope C Sheffield
(74) *Attorney, Agent, or Firm* — Sheridan Ross P.C.

(57) ABSTRACT

Determining risks based on data from a plurality of disassociated domains can comprise obtaining data regarding an individual from each of the plurality of disassociated domains. The data regarding the individual can have format and content specific to the domain from which it is obtained. The obtained data can be tagged based on the domain from which it is obtained and a set of predefined elements for each of the plurality of disassociated domains. The tagged data can be associated with one or more of a plurality of predefined groups. Each group can represent one or more of the plurality of disassociated domains. A diagnostic process identifying a risk for the individual in each of the domains can be performed on the tagged data and a user interface including a visual representation of the identified risk in each domain in each of the predefined groups can be provided.

20 Claims, 7 Drawing Sheets

NINEPATCH ONEVIEW

CROSS REFERENCE TO RELATED APPLICATION

The present application claims the benefits of and priority, under 35 U.S.C. § 119(e), to U.S. Provisional Application No. 63/018,112 filed Apr. 30, 2020 by Thompson, et al. and entitled "Community Resource Network OneView" of which the entire disclosure is incorporated herein by reference for all purposes.

FIELD OF THE DISCLOSURE

Embodiments of the present disclosure relate generally to methods and systems for determining risks for an individual and more particularly to determining risks based on data from a plurality of disassociated domains.

BACKGROUND

Arising from research performed by the World Health Organization in the early 2000s, the concept of 'Social Determinants of Health' (SDoH) posits that a person's overall health is greatly dependent on things not typically addressed by 'healthcare' providers (i.e., medical doctors). Things like food insecurity, lack of childcare, stress, depression, and financial problems, let alone more acute issues like homelessness, mental illness, or addiction, have a great effect on a person's overall well-being and capacity for living a healthy life. While there is no clear consensus on the extent to which SDoH factors may influence a person's wellbeing, a University of Wisconsin Public Health Institute review of literature on this topic suggested that socio-economic factors may influence as much as 40% of a person's health outcome; a threshold twice the weighting of clinical care itself.

While the SDoH concept appears to be relatively straightforward if not common-sensical, in practice the three main care domains, i.e., medical, behavioral, and social services, are incredibly siloed, with many organizations acting in extremely conservative ways to (understandably) limit liability surrounding the exposure of sensitive personal data. While this may be a necessary decision for the organizations in and of themselves, this strategy often works against the best interest of the patient/client for whom they are ostensibly providing care, especially when multiple providers at different organizations are serving the same patient/client. This client ends up having several profiles spread around various information systems, forced to repeat the same contact and demographic information time after frustrating time, wasting provider time gathering this duplicative information, and introducing variability and inconsistencies across the records, and providing many opportunities for error.

This situation is even more devastating for vulnerable populations in particular (e.g., homeless, elderly, substance misuse, etc.), who often have multiple issues and need services across several care categories. Hence, there is a need for improved methods and systems for bridging the different care domains and facilitating access to and delivery of services.

BRIEF SUMMARY

Embodiments of the disclosure provide systems and methods for collecting information related to an individual's Social Determinants of Health (SDoH) from a variety of sources, organizing and analyzing that data, presenting visual representations of risks for that individual based on the analysis of the collected data, and providing access to service providers to assist the individual in dealing with those risks. According to one embodiment, a method for determining risks based on data from a plurality of disassociated domains can comprise obtaining, by a processor of a Social Information Exchange (SIE) platform, data regarding an individual from one or more systems of each of the plurality of disassociated domains. The data regarding the individual can have format and content specific to the domain from which it is obtained. The obtained data can be tagged based on the domain from which it is obtained and a set of predefined elements for each of the plurality of disassociated domains. The tagged data can be associated with one or more of a plurality of predefined groups. Each group can represent one or more of the plurality of disassociated domains. For example, the plurality of predefined groups, the plurality of disassociated domains, and the set of predefined elements for each of the plurality of disassociated domains can be based on a predefined set of SDoH.

The tagged data can be stored in the format specific to the domain from which it is obtained. In some cases, one or more queries can be performed on the tagged data stored in the format specific to the domain from which it is obtained. The tagged data can also be normalized.

A diagnostic process can be performed on the tagged data. The diagnostic process can identify a risk for the individual in each of the plurality of domains based on the tagged data. Performing the diagnostic process on the tagged data can be performed on the normalized tagged data and can comprise scoring each element of the set of predefined elements for each of the plurality of disassociated domains and generating an aggregated score for each domain of the plurality of disassociated domains based on the scored elements in each domain. A user interface including a visual representation of the identified risk for the individual in each of the plurality of domains in each of the plurality of predefined groups can then be provided. The identified risk for the individual in each of the plurality of domains in each of the plurality of predefined groups in the visual representation of the user interface can be based on the scoring of each element of the set of predefined elements for each of the plurality of disassociated domains.

The risk for the individual in each of the plurality of domains can later be updated. The update can be based on obtaining new data regarding the individual from at least one of the plurality of disassociated domains, tagging the obtained new data, associating the tagged new data with one or more of the plurality of predefined groups, normalizing the tagged new data, and performing the diagnostic process on the normalized new data. A machine learning process can then be applied based on the updated risk. The machine learning process can update at least one element of the set of predefined elements for at least one of the plurality of disassociated domains.

According to another embodiment, a system can comprise a processor and a memory coupled with and readable by the processor. The memory can store therein a set of instructions which, when executed by the processor, causes the processor to determine risks based on data from a plurality of disassociated domains by obtaining data regarding an individual from one or more systems of each of the plurality of disassociated domains. The data regarding the individual can have format and content specific to the domain from which it is obtained. The instructions can further cause the process to tag the obtained data based on the domain from which it is obtained and a set of predefined elements for each of the plurality of disassociated domains and associate the tagged data with one or more of a plurality of predefined groups. Each group can represent one or more of the plurality of disassociated domains. For example, the plurality of predefined groups, the plurality of disassociated domains, and the set of predefined elements for each of the plurality of disassociated domains can be based on a predefined set of SDoH.

The instructions can further cause the processor to store the tagged data in the format specific to the domain from which it is obtained. In some cases, the instructions can cause the processor to perform one or more queries on the tagged data stored in the format specific to the domain from which it is obtained. The instructions can further cause the processor to normalize the tagged data.

The instructions can further cause the processor to perform a diagnostic process on the tagged data. The diagnostic process can identify a risk for the individual in each of the plurality of domains based on the tagged data. Performing the diagnostic process on the tagged data can be performed on the normalized tagged data and can comprise scoring each element of the set of predefined elements for each of the plurality of disassociated domains and generating an aggregated score for each domain of the plurality of disassociated domains based on the scored elements in each domain. The instructions can further cause the processor to provide a user interface including a visual representation of the identified risk for the individual in each of the plurality of domains in each of the plurality of predefined groups. The identified risk for the individual in each of the plurality of domains in each of the plurality of predefined groups in the visual representation of the user interface can be based on the scoring of each element of the set of predefined elements for each of the plurality of disassociated domains.

The instructions can further cause the processor to update the risk for the individual in each of the plurality of domains. The update can be based on obtaining new data regarding the individual from at least one of the plurality of disassociated domains, tagging the obtained new data, associating the tagged new data with one or more of the plurality of predefined groups, normalizing the tagged new data, and performing the diagnostic process on the normalized new data. The instructions can further cause the processor to apply a machine learning process based on the updated risk. The machine learning process can update at least one element of the set of predefined elements for at least one of the plurality of disassociated domains.

According to yet another embodiment, a non-transitory, computer-readable medium can comprise a set of instructions stored therein which, when executed by a processor, causes the processor to determine risks based on data from a plurality of disassociated domains by obtaining data regarding an individual from one or more systems of each of the plurality of disassociated domains. The data regarding the individual can have format and content specific to the domain from which it is obtained. The instructions can further cause the process to tag the obtained data based on the domain from which it is obtained and a set of predefined elements for each of the plurality of disassociated domains and associate the tagged data with one or more of a plurality of predefined groups. Each group can represent one or more of the plurality of disassociated domains. For example, the plurality of predefined groups, the plurality of disassociated domains, and the set of predefined elements for each of the plurality of disassociated domains can be based on a predefined set of SDoH.

The instructions can further cause the processor to store the tagged data in the format specific to the domain from which it is obtained. In some cases, the instructions can cause the processor to perform one or more queries on the tagged data stored in the format specific to the domain from which it is obtained. The instructions can further cause the processor to normalize the tagged data.

The instructions can further cause the processor to perform a diagnostic process on the tagged data. The diagnostic process can identify a risk for the individual in each of the plurality of domains based on the tagged data. Performing the diagnostic process on the tagged data can be performed on the normalized tagged data and can comprise scoring each element of the set of predefined elements for each of the plurality of disassociated domains and generating an aggregated score for each domain of the plurality of disassociated domains based on the scored elements in each domain. The instructions can further cause the processor to provide a user interface including a visual representation of the identified risk for the individual in each of the plurality of domains in each of the plurality of predefined groups. The identified risk for the individual in each of the plurality of domains in each of the plurality of predefined groups in the visual representation of the user interface can be based on the scoring of each element of the set of predefined elements for each of the plurality of disassociated domains.

The instructions can further cause the processor to update the risk for the individual in each of the plurality of domains. The update can be based on obtaining new data regarding the individual from at least one of the plurality of disassociated domains, tagging the obtained new data, associating the tagged new data with one or more of the plurality of predefined groups, normalizing the tagged new data, and performing the diagnostic process on the normalized new data. The instructions can further cause the processor to apply a machine learning process based on the updated risk. The machine learning process can update at least one element of the set of predefined elements for at least one of the plurality of disassociated domains.

Figure 1:
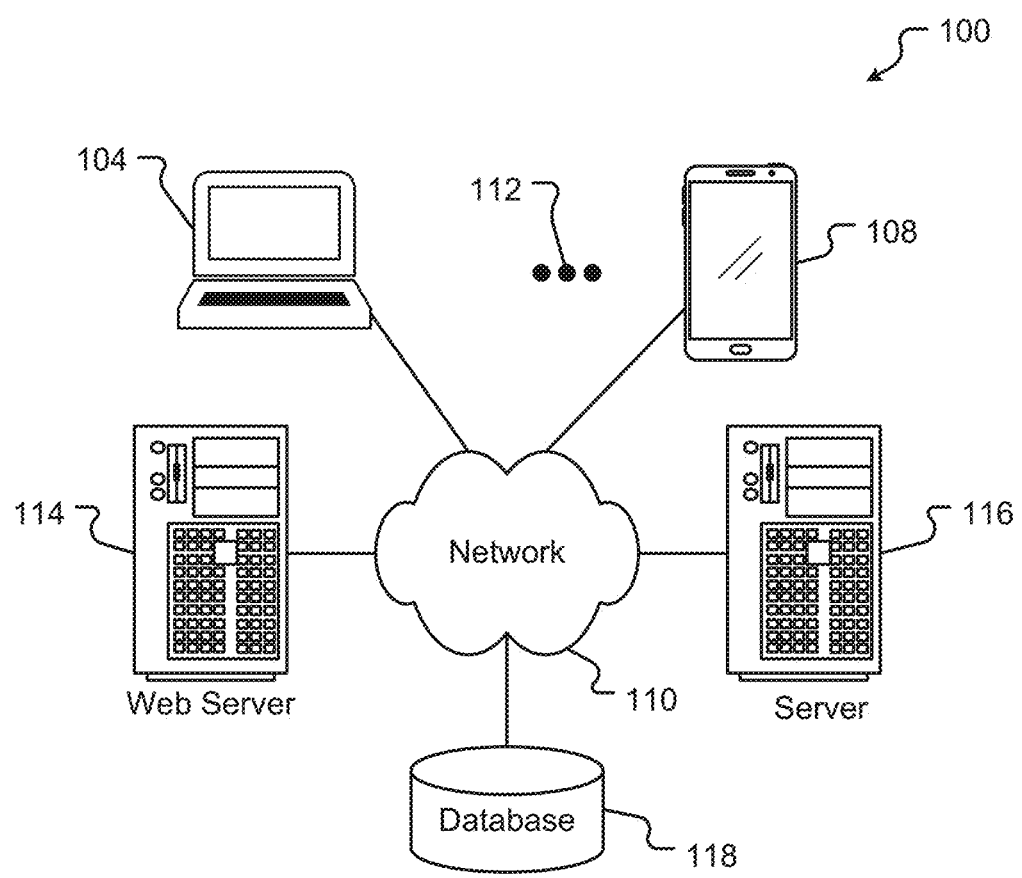
FIG. 1 is a block diagram illustrating elements of an exemplary computing environment in which embodiments of the present disclosure may be implemented.

In the appended figures, similar components and/or features may have the same reference label. Further, various components of the same type may be distinguished by following the reference label by a letter that distinguishes among the similar components. If only the first reference label is used in the specification, the description is applicable to any one of the similar components having the same first reference label irrespective of the second reference label.

DETAILED DESCRIPTION

In the following description, for the purposes of explanation, numerous specific details are set forth in order to provide a thorough understanding of various embodiments disclosed herein. It will be apparent, however, to one skilled in the art that various embodiments of the present disclosure may be practiced without some of these specific details. The ensuing description provides exemplary embodiments only and is not intended to limit the scope or applicability of the disclosure. Furthermore, to avoid unnecessarily obscuring the present disclosure, the preceding description omits a number of known structures and devices. This omission is not to be construed as a limitation of the scopes of the claims. Rather, the ensuing description of the exemplary embodiments will provide those skilled in the art with an enabling description for implementing an exemplary embodiment. It should however be appreciated that the present disclosure may be practiced in a variety of ways beyond the specific detail set forth herein.

While the exemplary aspects, embodiments, and/or configurations illustrated herein show the various components of the system collocated, certain components of the system can be located remotely, at distant portions of a distributed network, such as a Local-Area Network (LAN) and/or Wide-Area Network (WAN) such as the Internet, or within a dedicated system. Thus, it should be appreciated, that the components of the system can be combined in to one or more devices or collocated on a particular node of a distributed network, such as an analog and/or digital telecommunications network, a packet-switch network, or a circuit-switched network. It will be appreciated from the following description, and for reasons of computational efficiency, that the components of the system can be arranged at any location within a distributed network of components without affecting the operation of the system.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

As used herein, the phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising," "including," and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

The term "computer-readable medium" as used herein refers to any tangible storage and/or transmission medium that participate in providing instructions to a processor for execution. Such a medium may take many forms, including but not limited to, non-volatile media, volatile media, and transmission media. Non-volatile media includes, for example, Non-Volatile Random-Access Memory (NVRAM), or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a Compact Disk Read-Only Memory (CD-ROM), any other optical medium, punch cards, paper tape, any other physical medium with patterns of holes, a Random-Access Memory (RAM), a Programmable Read-Only Memory (PROM), and Erasable Programable Read-Only Memory (EPROM), a Flash-EPROM, a solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the disclosure is considered to include a tangible storage medium or distribution medium and prior art-recognized equivalents and successor media, in which the software implementations of the present disclosure are stored.

A "computer readable signal" medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, Radio Frequency (RF), etc., or any suitable combination of the foregoing.

The terms "determine," "calculate," and "compute," and variations thereof, as used herein, are used interchangeably and include any type of methodology, process, mathematical operation or technique.

It shall be understood that the term "means" as used herein shall be given its broadest possible interpretation in accordance with 35 U.S.C., Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary of the disclosure, brief description of the drawings, detailed description, abstract, and claims themselves.

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Any combination of one or more computer readable medium(s) may be utilized. The computer readable medium may be a computer readable signal medium or a computer readable storage medium.

In yet another embodiment, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as Programmable Logic Device (PLD), Programmable Logic Array (PLA), Field Programmable Gate Array (FPGA), Programmable Array Logic (PAL), special purpose computer, any comparable means, or the like. In general, any device(s) or means capable of implementing the methodology illustrated herein can be used to implement the various aspects of this disclosure. Exemplary hardware that can be used for the disclosed embodiments, configurations, and aspects includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

Examples of the processors as described herein may include, but are not limited to, at least one of Qualcomm® Snapdragon® 800 and 801, Qualcomm® Snapdragon® 610 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, other industry-equivalent processors, and may perform computational functions using any known or future-developed standard, instruction set, libraries, and/or architecture.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or Very Large-Scale Integration (VLSI) design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as program embedded on personal computer such as an applet, JAVA® or Common Gateway Interface (CGI) script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the aspects, embodiments, and/or configurations with reference to particular standards and protocols, the aspects, embodiments, and/or configurations are not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

Various additional details of embodiments of the present disclosure will be described below with reference to the figures. While the flowcharts will be discussed and illustrated in relation to a particular sequence of events, it should be appreciated that changes, additions, and omissions to this sequence can occur without materially affecting the operation of the disclosed embodiments, configuration, and aspects.

FIG. 1 is a block diagram illustrating elements of an exemplary computing environment in which embodiments of the present disclosure may be implemented. More specifically, this example illustrates a computing environment 100 that may function as the servers, user computers, or other systems provided and described herein. The environment 100 includes one or more user computers, or computing devices, such as a computing device 104, a communication device 108, and/or more 112. The computing devices 104, 108, 112 may include general purpose personal computers (including, merely by way of example, personal computers, and/or laptop computers running various versions of Microsoft Corp.'s Windows® and/or Apple Corp.'s Macintosh® operating systems) and/or workstation computers running any of a variety of commercially-available UNIX® or UNIX-like operating systems. These computing devices 104, 108, 112 may also have any of a variety of applications, including for example, database client and/or server applications, and web browser applications. Alternatively, the computing devices 104, 108, 112 may be any other electronic device, such as a thin-client computer, Internet-enabled mobile telephone, and/or personal digital assistant, capable of communicating via a network 110 and/or displaying and navigating web pages or other types of electronic documents. Although the exemplary computer environment 100 is shown with two computing devices, any number of user computers or computing devices may be supported.

Environment 100 further includes a network 110. The network 110 may can be any type of network familiar to those skilled in the art that can support data communications using any of a variety of commercially-available protocols, including without limitation Session Initiation Protocol (SIP), Transmission Control Protocol/Internet Protocol (TCP/IP), Systems Network Architecture (SNA), Internetwork Packet Exchange (IPX), AppleTalk, and the like. Merely by way of example, the network 110 maybe a Local Area Network (LAN), such as an Ethernet network, a Token-Ring network and/or the like; a wide-area network; a virtual network, including without limitation a Virtual Private Network (VPN); the Internet; an intranet; an extranet; a Public Switched Telephone Network (PSTN); an infra-red network; a wireless network (e.g., a network operating under any of the IEEE 802.9 suite of protocols, the Bluetooth® protocol known in the art, and/or any other wireless protocol); and/or any combination of these and/or other networks.

The system may also include one or more servers 114, 116. In this example, server 114 is shown as a web server and server 116 is shown as an application server. The web server 114, which may be used to process requests for web pages or other electronic documents from computing devices 104, 108, 112. The web server 114 can be running an operating system including any of those discussed above, as well as any commercially-available server operating systems. The web server 114 can also run a variety of server applications, including SIP servers, HyperText Transfer Protocol (secure) (HTTP(s)) servers, FTP servers, CGI servers, database servers, Java servers, and the like. In some instances, the web server 114 may publish operations available operations as one or more web services.

The environment 100 may also include one or more file and or/application servers 116, which can, in addition to an operating system, include one or more applications accessible by a client running on one or more of the computing devices 104, 108, 112. The server(s) 116 and/or 114 may be one or more general purpose computers capable of executing programs or scripts in response to the computing devices 104, 108, 112. As one example, the server 116, 114 may execute one or more web applications. The web application may be implemented as one or more scripts or programs written in any programming language, such as Java™, C, C#®, or C++, and/or any scripting language, such as Perl, Python, or Tool Command Language (TCL), as well as combinations of any programming/scripting languages. The application server(s) 116 may also include database servers, including without limitation those commercially available from Oracle®, Microsoft®, Sybase®, IBM® and the like, which can process requests from database clients running on a computing device 104, 108, 112.

The web pages created by the server 114 and/or 116 may be forwarded to a computing device 104, 108, 112 via a web (file) server 114, 116. Similarly, the web server 114 may be able to receive web page requests, web services invocations, and/or input data from a computing device 104, 108, 112 (e.g., a user computer, etc.) and can forward the web page requests and/or input data to the web (application) server 116. In further embodiments, the server 116 may function as a file server. Although for ease of description, FIG. 1 illustrates a separate web server 114 and file/application server 116, those skilled in the art will recognize that the functions described with respect to servers 114, 116 may be performed by a single server and/or a plurality of specialized servers, depending on implementation-specific needs and parameters. The computer systems 104, 108, 112, web (file) server 114 and/or web (application) server 116 may function as the system, devices, or components described herein.

The environment 100 may also include a database 118. The database 118 may reside in a variety of locations. By way of example, database 118 may reside on a storage medium local to (and/or resident in) one or more of the computers 104, 108, 112, 114, 116. Alternatively, it may be remote from any or all of the computers 104, 108, 112, 114, 116, and in communication (e.g., via the network 110) with one or more of these. The database 118 may reside in a Storage-Area Network (SAN) familiar to those skilled in the art. Similarly, any necessary files for performing the functions attributed to the computers 104, 108, 112, 114, 116 may be stored locally on the respective computer and/or remotely, as appropriate. The database 118 may be a relational database, such as Oracle 20i®, that is adapted to store, update, and retrieve data in response to Structured Query Language (SQL) formatted commands.

Figure 2:
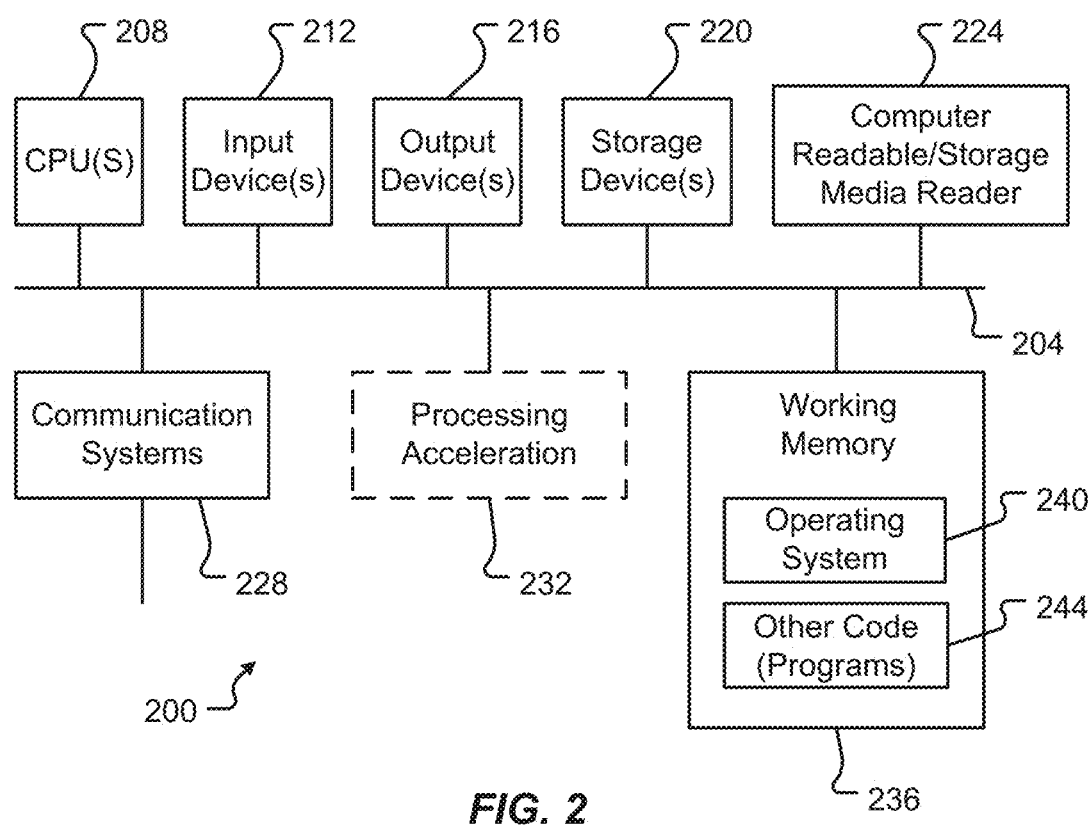
FIG. 2 is a block diagram illustrating elements of an exemplary computing device in which embodiments of the present disclosure may be implemented.

FIG. 2 is a block diagram illustrating elements of an exemplary computing device in which embodiments of the present disclosure may be implemented. More specifically, this example illustrates one embodiment of a computer system 200 upon which the servers, user computers, computing devices, or other systems or components described above may be deployed or executed. The computer system 200 is shown comprising hardware elements that may be electrically coupled via a bus 204. The hardware elements may include one or more Central Processing Units (CPUs) 208; one or more input devices 212 (e.g., a mouse, a keyboard, etc.); and one or more output devices 216 (e.g., a display device, a printer, etc.). The computer system 200 may also include one or more storage devices 220. By way of example, storage device(s) 220 may be disk drives, optical storage devices, solid-state storage devices such as a Random-Access Memory (RAM) and/or a Read-Only Memory (ROM), which can be programmable, flash-updateable and/or the like.

The computer system 200 may additionally include a computer-readable storage media reader 224; a communications system 228 (e.g., a modem, a network card (wireless or wired), an infra-red communication device, etc.); and working memory 236, which may include RAM and ROM devices as described above. The computer system 200 may also include a processing acceleration unit 232, which can include a Digital Signal Processor (DSP), a special-purpose processor, and/or the like.

The computer-readable storage media reader 224 can further be connected to a computer-readable storage medium, together (and, optionally, in combination with storage device(s) 220) comprehensively representing remote, local, fixed, and/or removable storage devices plus storage media for temporarily and/or more permanently containing computer-readable information. The communications system 228 may permit data to be exchanged with a network and/or any other computer described above with respect to the computer environments described herein. Moreover, as disclosed herein, the term "storage medium" may represent one or more devices for storing data, including ROM, RAM, magnetic RAM, core memory, magnetic disk storage mediums, optical storage mediums, flash memory devices and/or other machine-readable mediums for storing information.

The computer system 200 may also comprise software elements, shown as being currently located within a working memory 236, including an operating system 240 and/or other code 244. It should be appreciated that alternate embodiments of a computer system 200 may have numerous variations from that described above. For example, customized hardware might also be used and/or particular elements might be implemented in hardware, software (including portable software, such as applets), or both. Further, connection to other computing devices such as network input/output devices may be employed.

Examples of the processors 208 as described herein may include, but are not limited to, at least one of Qualcomm® Snapdragon® 800 and 801, Qualcomm® Snapdragon® 620 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, other industry-equivalent processors, and may perform computational functions using any known or future-developed standard, instruction set, libraries, and/or architecture.

According to one embodiment, any one or more of the various systems described above can be used to implement a Social Information Exchange (SIE) platform. Generally speaking, a SIE can fill the gaps people face getting the help they need across a range of services like housing, food and transportation. It can be a person-centric, Social Determinants of Health (SDoH)-focused social information exchange which gives medical, social service, and behavioral health providers a rich, shared, 'whole person' view to better communicate, collaborate, share and analyze data, and improve client outcomes.

One example of a SIE platform is the NinePatch application, developed in partnership between Quality Health Network of Grand Junction, CO, and Stella Technology, Sam Jose, CA, which can bring together service end points from health, behavioral and social entities. Such a system can facilitate access to a shared client record populated using data collected through various configurable interfaces. A user of the system can engage service providers from a community resource directory and work collaboratively with them as part of a shared client care team. In this manner practitioners, regardless of business sector, can engage in secure care coordination activities rooted in whole-person health. Such a SIE platform can promote coordination through shared case planning, referral and team facilitation functionality. According to one embodiment, a SIE platform can provide a user interface comprising a unified view of SDoH factors. This interface can include a risk index visualization based on a predictive model of risk factors.

Embodiments of the present disclosure can comprise a data ingestion and data modeling approach designed to link evidence-based indicators of risk with corresponding success indicators and outcomes. Embodiments include an ability to ingest and absorb a wide range of data from different sources, a data model which maps each of these incoming data points to elements of a predictive model designed to calculate risk along the domains, and the ability to receive and incorporate feedback to adjust individual risk scores and reflect progress made towards measurable outcomes.

According to one embodiment, a SIE platform can be built on an open architecture based on the Smart on Fast Healthcare Interoperability Resources (FHIR) web interoperability standard. This framework allows the system to readily ingest other Smart on FHIR web services, as well as data exchange services from other common frameworks, including, but not limited to, National Information Exchange Model (NIEM) based data exchanges, Health Level Seven (HL7), Common Referral Standard, and/or 211 Alliance of Information and Referral Systems (AIRS) framework. The ability to readily integrate with different data structures allows the system to ingest new sources of information related to individual circumstances, demographics, health or behavioral health events and interaction with social services. This information can be mapped to a common data framework that indexes new, incoming data against a framework of risk/need indicators.

These indicators can comprise the building blocks of the risk determinations made by the SIE platform. For example, each of the indicators can be assigned a series of research informed weights to set the initial assumptions of the algorithm. These values can form a linear regression model that can function like a multi-layer neural network, where several layers of interrelated factors can combine to produce a set of risk scores to be provided in the visual representation of risk factors. Once a sufficient threshold of data is collected in the system the system can begin to recalculate the weights based on the unique circumstances of a particular implementation. This can allow implementation-level population context to take a more prominent role in the model. This feedback mechanism can also inform the calibration of the algorithm as a whole, where the model begins to adapt for all customers based on the collective experience of users of the system as a whole.

The model can also comprise a feedback mechanism realized through interfaces with various data sources. This feedback can include data triggers that indicate, for example, that a circumstance has an improved, e.g., the individual' job status changes from unemployed to employed, or a new address is detected from an HL7 message. It also could come in the form of data entered by case management and care coordination users of the system recording the outcome of program or service engagements and case planning objectives. The system can respond to these feedback measures by adjusting the individual's set of attributes being fed into the model. If someone goes from unemployed to employed the dimension of the model related to employment and income will improve. Similarly, if a case plan objective of completing a job program is successfully completed, the individual's employment prospects may also begin to reflect improvement, even without yet transitioning into employment. The objective here is to balance the factors to detect risk with strategies and activities designed to mitigate or nullify these risks. In this way the platform can provide a truly comprehensive picture of point in time need as well as indicators of progress made towards achieving positive health, behavioral health and social outcomes.

There is great value to being able to quickly communicate a 'whole person' view in seconds, compared to the hours and hours of reading individual assessments and case notes which may or may not be a complete set of what's been documented across domains. This will save providers much time and effort, giving them a big head start on getting to work with the client. Having a more consistent view of a client's needs will allow better targeting interventions, and, most importantly, will save the clients themselves much time and frustration telling their same difficult story time and time again to multiple agencies. Embodiments described herein free provider time and reduce duplicative effort, improve accuracy of records, provide comprehensiveness with additive, combined record, and provide a less frustrating client experience by eliminating a need for the client to tell the same story over and over, likely in slightly different ways.

Figure 3:
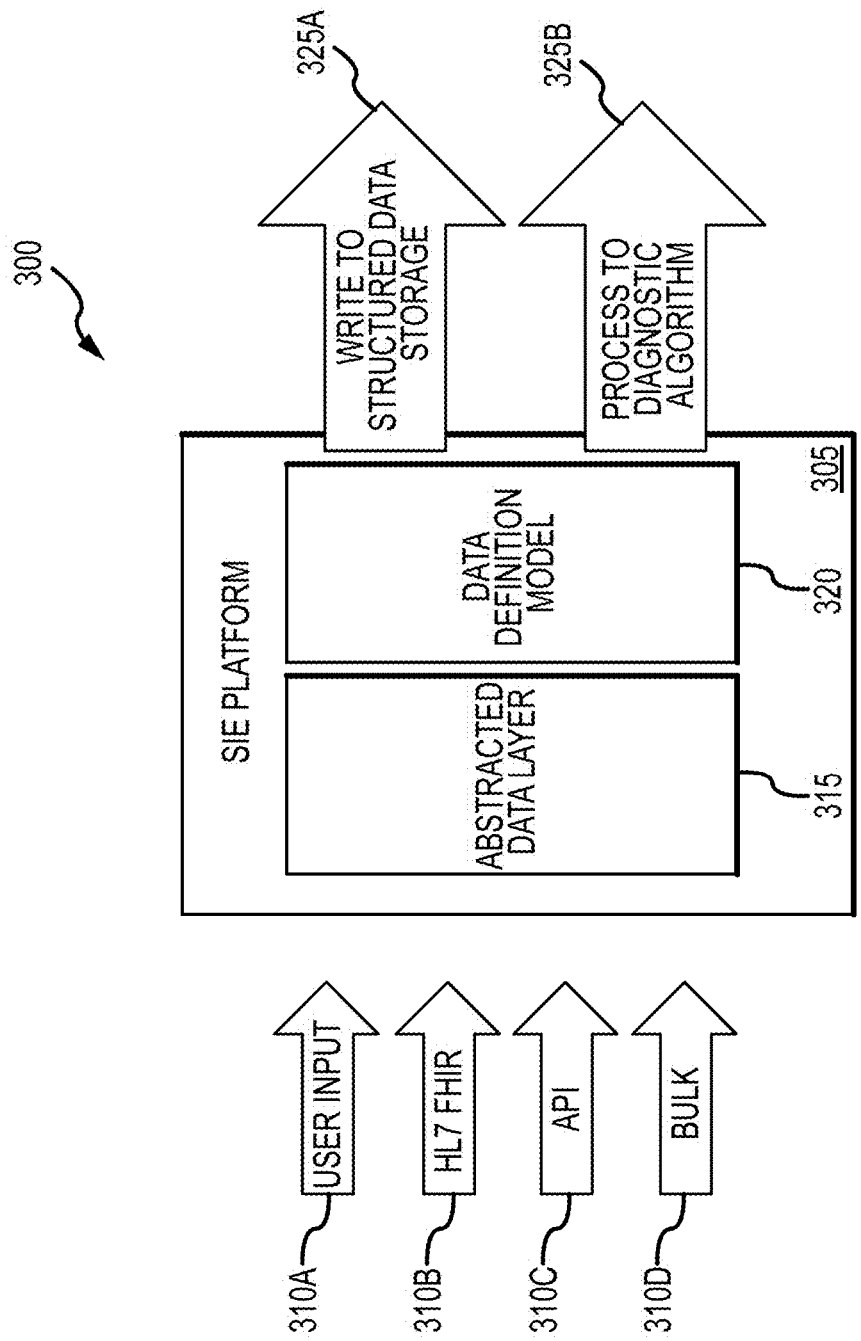
FIG. 3 is a block diagram illustrating, at a high level, an exemplary process for providing a unified view of risk factors according to one embodiment of the present disclosure.

FIG. 3 is a block diagram illustrating, at a high level, an exemplary process for providing a unified view of risk factors according to one embodiment of the present disclosure. As illustrated in this example, an environment 300 for proving a unified view of risk factors can comprise a SIE platform 305 which can be implemented and executed on any one or more servers and/or other computing devices as described above. Generally speaking, the SIE platform 305 can process incoming data from a variety of sources 310A-310D. These data sources 310A-310D can include, but are not limited to, user input 310A, e.g., through a user interface presented by the SIE platform 305, a source remote server or system (not shown here) providing HL7 FHIR data 310B, an Application Program Interface (API) 310C through which a variety of systems (not shown here) may interface with the SIE platform 305, and a bulk data source 310D through which data of various types may be uploaded or provided to the SIE platform 305. Each of these different types of data can be processed by the SIE platform 305 into compartments according to a process to ingest and tag new data elements and associate these elements with a role or roles. This approach has two benefits. First, it allows an interface for the SIE platform 305 to be configured in a variety of ways to accommodate the unique data capture configuration of a given implementation of the SIE platform 305. Secondly, it provides a consistent mechanism for adapting new data elements to the SIE platform's 305 existing practice framework. This creates a unique machine learning environment where data elements can be introduced into the process dynamically and added into subsequent scoring calculations even without having a comprehensive base of sample data from which to develop algorithms from.

The SIE platform 305 can further comprise an abstraction data layer 315 and a data definition model 320. The abstracted data layer 315 and data definition model 320 can work together to absorb and manage a wide range of data input into the SIE platform 305. This model can make use of a non-relational schema to build input template maps into object/array associations that allow the SIE platform 305 to record the input mapping of a data source at the atomic field level.

More specifically, the abstraction data layer 315 can capture incoming elements in their native format in order to stage the data for processing against a template specification. Data stored in the abstraction layer can include, but is not limited to:

input instance metadata, e.g., ID, instance source, date, template ID, etc.;
input values, e.g., captured according to the input template, loaded as JavaScript Object Notation (JSON) array or element (column/row) pairings, etc.; and/or
form generated content from user created form elements.

The data definition model 320 can capture an input template structure. This structure can consist of, but is not limited to:

template metadata elements such as ID, name, form type, creation user, dates, etc.;
template access specifications such as entity, access level, dates, etc.;
a template definition specification such as specification type, e.g., HL7, FHIR, Subjective, Objective, Assessment and Plan (SOAP), Rest, eXtensible Markup Language (XML) Schema Definition (XSD), and/or others, a specification schema, dates, etc.;
template elements such as element, label, type, date, SIE platform 305 target mapping, mapping type, e.g., append, overwrite, ignore; and/or
a template trigger event such as entity, event type, e.g., notification, alert, data submission, etc., event condition, event specification, dates, etc.

According to one embodiment, data in the abstracted data layer 315 can be queried by the SIE platform 305 using the specifications in the data definition model 320 without the need for further normalization or processing. Additionally, or alternatively, the incoming data from the various data sources 310A-310D can be subsequently normalized into native SIE platform 305 data structures. This allows the SIE platform 305 configuration to govern management of insert, update, and delete operations against its core dataset, preserving the integrity of the SIE platform 305 data source, i.e., providing a single source of truth, in conjunction with the context data provided by additional input sources. For example, an HL7 Admission, Discharge, Transfer (ADT) message can be passed through an electronic health record or health information exchange data source 310B and loaded into the abstraction data layer 315 in its unqualified native HL7, XML or JSON structure.

For example, an HL7 ADT message can be absorbed into the abstract data storage layer 315 from a data source 310B. From the abstraction data layer 315, the data definition model 32—can be applied to the message based on type and source to extract structured content from the body of the message. This extraction process can identify data elements such as demographics, e.g., name, identity keys, address, etc. and write those elements to SIE platform 305 data storage 325A. Additionally, or alternatively, the data can be submitted to a diagnostic process 325B as will be described in greater detail below. Generally speaking, this process can traverse the data to look for tagged indicators that might suggest the presence of risk and/or mitigating factors.

Figure 4:
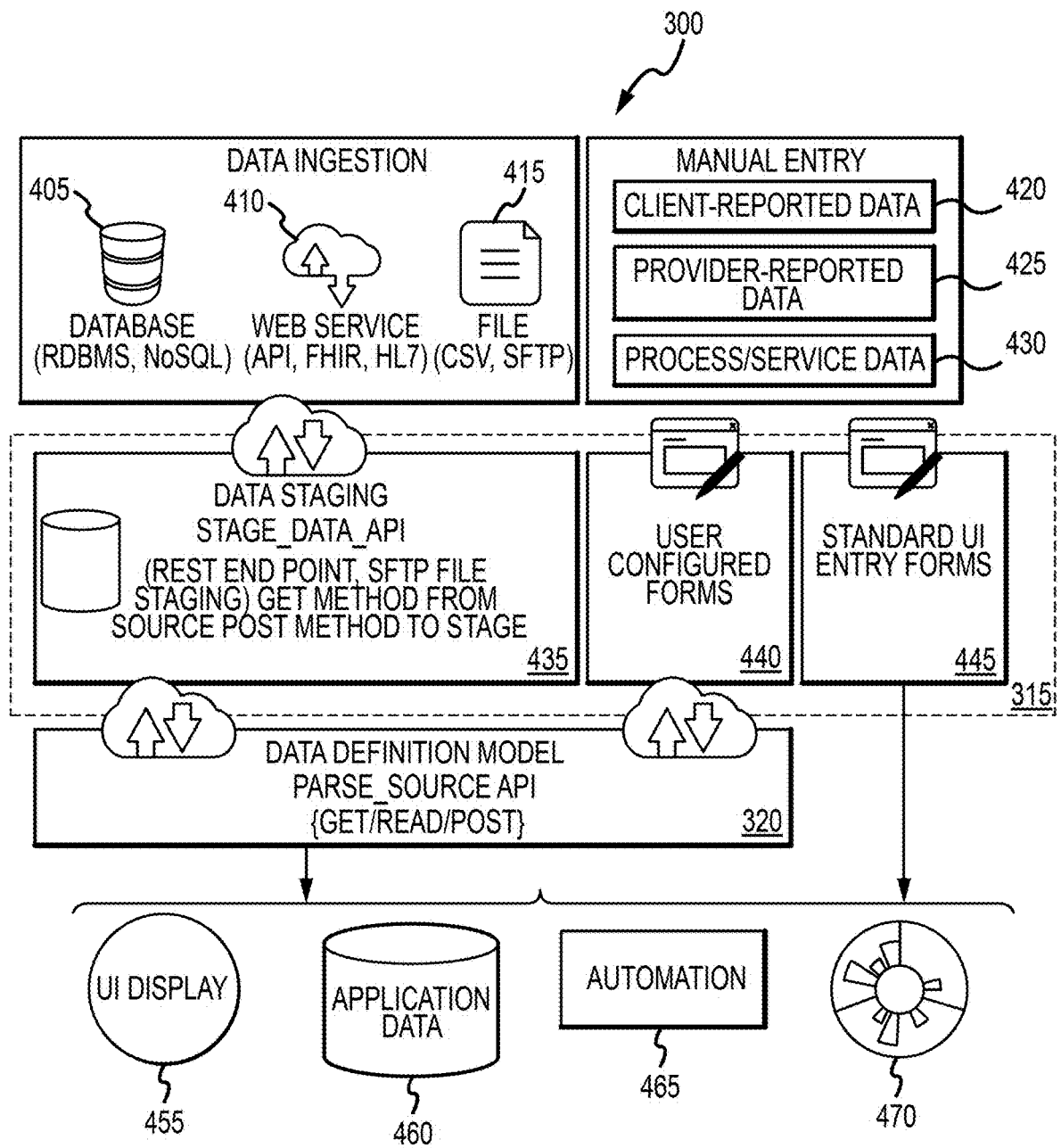
FIG. 4 is a block diagram illustrating components of an exemplary architecture for a Social Information Exchange (SIE) platform according to one embodiment of the present disclosure.

FIG. 4 is a block diagram illustrating components of an exemplary architecture for a SIE platform according to one embodiment of the present disclosure. As illustrated in this example, and as introduced above, the architecture of the SIE platform 300 acquire input data from a variety of data sources and thus can include interfaces for data ingestion from one or more local or remote databases 405 maintained by the SIE platform 305 or another system, one or more web services 410, and/or one or more local or remote files maintained by the SIE platform 305 or another system. Additionally, or alternatively, the SIE platform 305 can receive manual data entry from a user of the system. This manually entered data can include, but is not limited to, client-reported data 430, provider-reported data 425, and/or process/service data 430.

As introduced above, the abstraction data layer 315 can capture incoming elements in their native format in order to stage the data for processing against a template specification. This can be accomplished through a data staging API that provides an interface to the data definition model 320 for the data from one or more of the database(s) 405, webservice(s) 410, and or file(s) 415. Additionally, data can be captured from one or more user configured forms 440 and/or one or more standard forms 445, e.g., served as one or more web pages and completed manually to provide one or more of the client-reported data 420, the provider-reported data 425, and/or the process/service data 430.

Also as introduced above, the data definition model 320 can capture an input template structure. Data in this input template structure can then be provided by the data definition model 320 to a number of destinations. For example, the data can be provided for display in a user interface 455 and/or saved in a repository of application data 460. Additionally, or alternatively, the data can be applied to one or more automated processes 465. In some cases, the data can additionally, or alternatively, be provided to a diagnostic process to generate a user interface providing a visual representation of risk factors.

More specifically, the diagnostic process standardizes diagnostic information using several domains based on widely accepted research into SDoH. While the number of social determinant factors can vary in different implementations, exemplary embodiments can utilize the following list of primary domains.

| | |
|---|---|
| Personal | Education |
| Personal | Safety |
| Personal | Community and Environment |
| Personal | Physical & Cognitive Capacity |
| Social | Housing |
| Social | Food |
| Social | Transportation |
| Social | Income and Employment |
| Social | HH Budget |
| Behavioral | Substance Abuse & Addiction |
| Behavioral | Mental Disorder |
| Health | Health Utilization |
| Health | Health Access |
| Health | Health Status |

The domain structure can allow for a large set of criteria and indicators to be grouped within each domain to allow for fine-tuned scoring to a number of different possible elements.

Domain elements can serve as high-level groupings for indicators of need, risk, or stability within the context of a domain. Elements can be predefined and used to associate common indices of need within each domain to a severity scoring model. Elements are intended to be broad and largely neutral in framing to allow for various states along a continuum to be reflected. An element can reflect historical risk, emerging need, escalating concern, or crisis.

Examples of elements by domain:

| Grouping | Domain | Elements |
|---|---|---|
| Personal | Education | High School Graduate/GED |
| | | Post-Secondary or Vocational Degree/Certification |
| | | Literacy, Language Fluency |
| | | Special Need Educational Scenario |
| Personal | Safety | Child Abuse or Neglect |
| | | Domestic or Other Family Abuse |
| | | Victim of Violent Crime or Harassment |
| | | Perpetrator of Crime or Felony |
| Personal | Community and Environment | Proximity to Industry or Byproduct |
| | | Social Isolation |
| | | Community Resource Capacity |
| | | Community Well Being |
| Personal | Physical & Cognitive Capacity | Physical Disability or Limitation |
| | | Cognitive Disability or Limitation |
| | | Reliance on Medical Device |
| Social | Housing | Homelessness |
| | | Housing Inadequacy |

-continued

| Grouping | Domain | Elements |
|---|---|---|
| | | Unsafe Housing |
| | | Eviction/Foreclosure |
| | | Residential Commitment |
| Social | Food | Hunger |
| | | Malnutrition/Nourishment |
| | | Food Access |
| | | Food relationship or health condition |
| Social | Transportation | Access to Transportation |
| | | Transportation Reliability |
| | | Transportation Restriction |
| Social | Income and Employment | Employment Status and History |
| | | Employment Marketability |
| | | Fixed/Limited Income Status |
| | | Employment Restriction or Limitation |
| Social | HH Budget | Debt Circumstance |
| | | Inability to Sustain Services |
| | | Credit Circumstance |
| | | Expense to Income Ratio |
| Behavioral | Substance Abuse & Addiction | Alcohol Abuse |
| | | Drug or Controlled Substance Abuse |
| | | Opioid Specific/Schedule IV-V |
| | | Drug Exposed |
| | | Other Addictive Behavior |
| Behavioral | Mental Disorder | Depression |
| | | Psychosis |
| | | Other Mental Disorder |
| Health | Health Utilization | ER Utilization |
| | | Preventive Services Adherence |
| | | Health Cost |
| | | Inpatient Utilization |
| Health | Health Access | Insurance Status |
| | | PCP/PCMP Attribution |
| | | Pharmacy Access |
| | | DME/Non Medical Services |
| | | Home Health/Home Care |
| Health | Health Status | Chronic Condition Management |
| | | Multiple Co-Morbidities |
| | | End of Life Care |
| | | At Risk Behaviors |
| | | Health Risk Factor |

Elements can be normalized on a continuous scale. The intent here is to assign a numerical value which is ordinal in nature and where lower values, e.g., down to 0, can indicate a weaker presence of the need and higher values e.g., up to 100 or another maximum value for the scale used, represent the most pressing or maximum presence of a need. This approach allows the scale to reflect a historical and prospective perspective when considering data input. It also allows for a range of interpretations of the element with indicators of need, risk, or progress in mitigating a concern.

This broad structure of the elements allows for a wide range of interpretations and scenarios to be accommodated. For example, one community can quantify need under Homelessness using data from a housing or homeless management system which may have exacting diagnostic detail about current homeless status, chronicity, youth vs adult involvement, adverse or compensatory behaviors, etc. With such a depth of input to draw from, fine gradations of need can be represented in the scoring. Conversely, a basic needs family resource program can still score the same domain, albeit perhaps with less diagnostic precision, by asking about current address, housing status, and rent to income amounts. The data definition model of the present disclosure can allow each community to quantify need according to the specific capacity of their data collection strategy.

Domain element definitions can be extended to a SIE platform community implementation instance. This structure, as shown below, allows for elements to be included or excluded from the community's model. This allows a community to tailor the emphasis on need to factors relevant to their communities and partnerships. The instantiation also allows for differentiation in cut off thresholds and weights at a community level. These can be adopted initially from the system defaults but tailored by user entry or altered over time by machine learning processes as data is fed into the system. For example, an urban community may desire to emphasize environment factors in the Community and Environment domain as proximity to industry or lack of access to community resources might be a key issue in an urban setting. Whereas a rural partnership implementation may not have any industrial factors germane to its population but social isolation and transportation access may be more critical risk factors in that setting.

The diagnostic process can use the indicators to compare the incoming data processed through the abstraction and data model structure to domain elements. Because data brought into the system can be modeled to the data definition layer, the specifics of each field in the system can be known to the diagnostic process and can be interpreted with respect to domain elements. In other words, this structure allows data coming in to SIE platform to be associated along the scoring continuum for any given element. These associations can be implicit or explicit or can be used in combination with other fields to derive the association as a result of a logical condition.

At a conceptual level, element scoring can take a number of indicators into consideration in determining the level of need or presence of a risk factor. These indicators can be organized in groups including, but not limited to demographic indicators, response indicators, and diagnostic indicators A demographic indicator can be an attribute of an individual or household which can be used as a weighting value to indicate whether a given need indicator should be amplified or mitigated in some way. These indicators may be identified directly in the set of standard demographics contained in the SIE platform data model, or could be called out as part of enhanced demographics added, e.g., via user created custom forms or interfaces. Examples of standard demographic can include age, gender, ethnicity, housing status, veteran status, etc. Examples of possible configurable demographics can include instance of ER utilization, birth weight, presence of a learning disability, clinical diagnosis, etc. Demographic indicators can be mapped to domain elements directly based on user entered associations or natural language processing associations.

Response indicators can establish the components of a feedback loop within a set of end user facing functionality that can inform the whether identified needs or risk factors are in the process of being addressed or if they have been successfully mitigated or responded to. The SIE platform can derive response indicators from a case plan data model and referral life cycle. For example, a case plan activity of "File for Unemployment" can imply a clear indicator of a need for supplemental income and a loss of employment. That this activity was 'successfully completed' would indicate that the identified need has, to some extent, been mitigated. Because response values for case plan outcomes and referral processing are fixed, these indicators may not be configurable to the end user. The myriad number of service options and case plan activities however can be configured by the user and associated with a service category and domain as they see fit.

Diagnostic indicators are often directly transcribable onto a domain element score. These indicators often come from structured assessment or screening tools, lab tests, clinical diagnosis, or other comparable inputs. The association of a diagnostic element to a domain indicator can be configurable. However, given the structured nature of these values, consideration should be given to the source as to how applicable a given diagnostic indicator is to a domain element and level of need.

An example of how indicators are derived will now be described using the domain "Housing" and the domain element "Homelessness." In this example, a diagnostic indicator of homelessness may be identified from a structured assessment like the ViSPDAT. The ViSPDAT is designed to provide a numeric score associated with the level of response or need for emergency housing resources. Taken as a whole or broken into constituent questions, incoming ViSPDAT assessment data can be mapped onto indicators of homelessness.

For example, a score of 10 would indicate that an individual is in need of permanent supportive housing. On the other hand, a specific element of the survey itself inquires as to where the individual sleeps most often, e.g., shelters, temporary housing, transitional housing, outdoors, etc. Any of these values could also, taken at face value, be an indicator of some level of homelessness or housing need.

Further, the specific housing setting value can likely be more readily mapped to other fields captured in other systems or tools to indicate a consistent presence of need, applicable across different data sources. Either way, a specific assessment score or specific question about housing circumstance or demographic characteristic can be interpreted by the diagnostic process as a diagnostic indicator of a housing need. Adding to the sensitivity and accuracy of the scoring could then be other factors. Demographic attributes can include whether the individual is a single individual or member of a family unit, a veteran, has a criminal background or violent felony, age, presence of a disability or substance abuse disorder, number of social or familial connections in the community, etc.

Each of these factors can be mapped to evidence frameworks that suggest how the presence of the factor may mitigate or contribute to the complexity or challenge faced by an individual with a housing need. In this example, a veteran may have more success in finding options for permanent supportive housing or programs given the number of resources commonly available to combat homelessness in the veteran population. In this case the veteran status demographic might actually serve to mitigate the level of severity of the homeless need. On the other hand, indicators like criminal background or age, particularly age in conjunction with years of homelessness, might help to raise the severity of risk or need faced by an individual who is homeless.

As an individual is served through the system, either by receiving referrals for service or engaging in structured case management based on a care plan, the SIE platform starts to record progress points and milestones using these values to augment an individual's diagnostic score. If an individual who is homeless becomes housed, either permanently or temporarily, the system can detect these outcomes and decrease the individual's level of risk in the diagnostic process. The progress markers and outcomes then become additional indicators, but not of need, rather indicators of progress.

It should be noted that there are many cross-domain associations and connections that can be used in diagnostic scoring. For example, if an individual is chronically ill, socially isolated and facing housing challenges, they could be at risk for losing or failing to keep employment even if there are no other indicators that income or employment or at risk. Embodiments of the present disclosure can provide the capacity to model any number of such scenarios and associations.

The data definition model can attach an atomic, i.e., field level, mapping to each incoming element. Incoming data specifications, or custom forms created by users within the SIE platform, can provide information about the specific fields and their data types. For example: the 7th value in the Patient IDentification (PID) segment of an Admit Discharge Transfer (ADT) (HL7 2.8.2) message is the patient's date of birth. Or a given question on a post-natal follow up screening could be "Child's date of birth." In both cases, the values from these respective sources are dates, and more specifically, birth dates. The SIE platform data definition model can associate both of these values to the "Birth Date" value using its data definition model structure as highlighted in the examples below.

In each of the above examples, the mappings would add the respective birth date value to the system value for Client "Birth Date." In some cases, these incoming values can be allowed to overwrite existing values in the system. Other options can include append, exception and ignore rather than overwrite.

The mapping for elements works similar to the mapping for data fields. The SIE platform system can allow the same structure to assign values to one or many domain indicators using direct mapping or conditional statements. For example, a structured assessment may ask how frequently an individual was "worried that your food would run out before you got money to buy more." The incoming values for this field may be "Often," "Sometimes," "Never." In this case, a user may want the Often and Sometimes values to indicate the presence of a need related to Food, i.e., Hunger. In this instance, mapping for the valid values of this field could be set to two different thresholds on the need indicator for Hunger.

The result of the mapping process can be a repeatable structure that can be applied by the SIE platform to any incoming data. Extending the above example, upon submission of a screener with the associated "Food Insecurity" question attached to it, the SIE platform can call the diagnostic process to process the newly submitted data to detect any new indicators that might be mapped to the diagnostic process. In this example, data is submitted with a response to "AHCM Food Insecurity Question 1" of "Often." This field can found in the set of mappings and the logical association can be read from the mapping as an explicit indicator of the Food Domain element "Hunger." The diagnostic process can then assigns a value of "75" for this element in the Food Domain for the client associated with the assessment.

Based on these mappings and the scores generated therefrom, the diagnostic process can generate and present a user interface providing a visual representation of risk factors for an individual. Exemplary user interfaces for presenting a visual representation of risk factors will now be described. However, it should be noted and understood that these examples are provided for illustrative purposes only and are not intended to limit the scope of the present disclosure. Rather, depending upon the exact implementation, numerous changes to the format and/or content of such user interfaces are contemplated and are considered to be within the scope of the present disclosure.

Figure 5A:
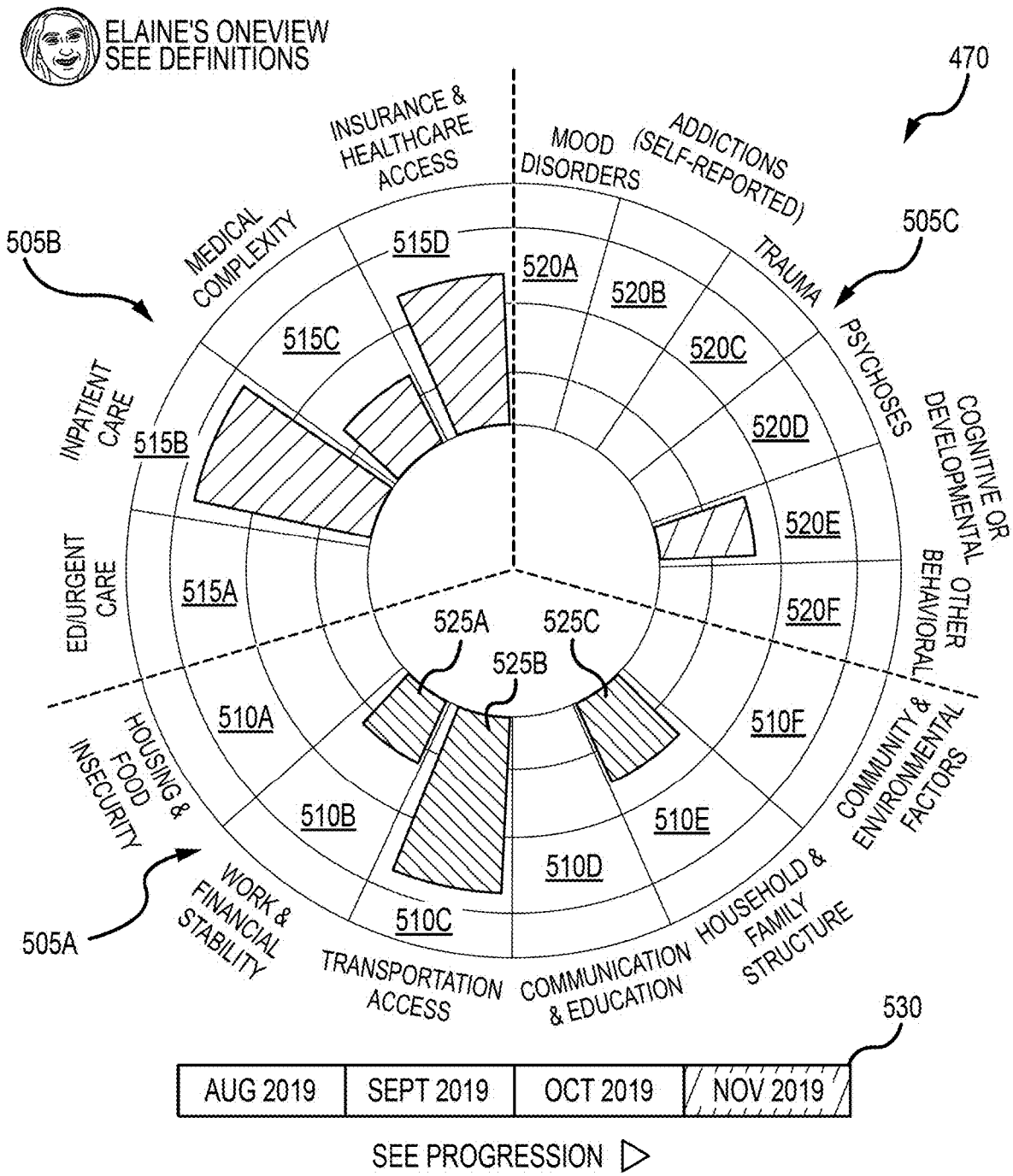
FIGS. 5A and 5B are screenshots illustrating details of an exemplary user interface for providing a unified view of risk factors according to one embodiment of the present disclosure.
Figure 5B:
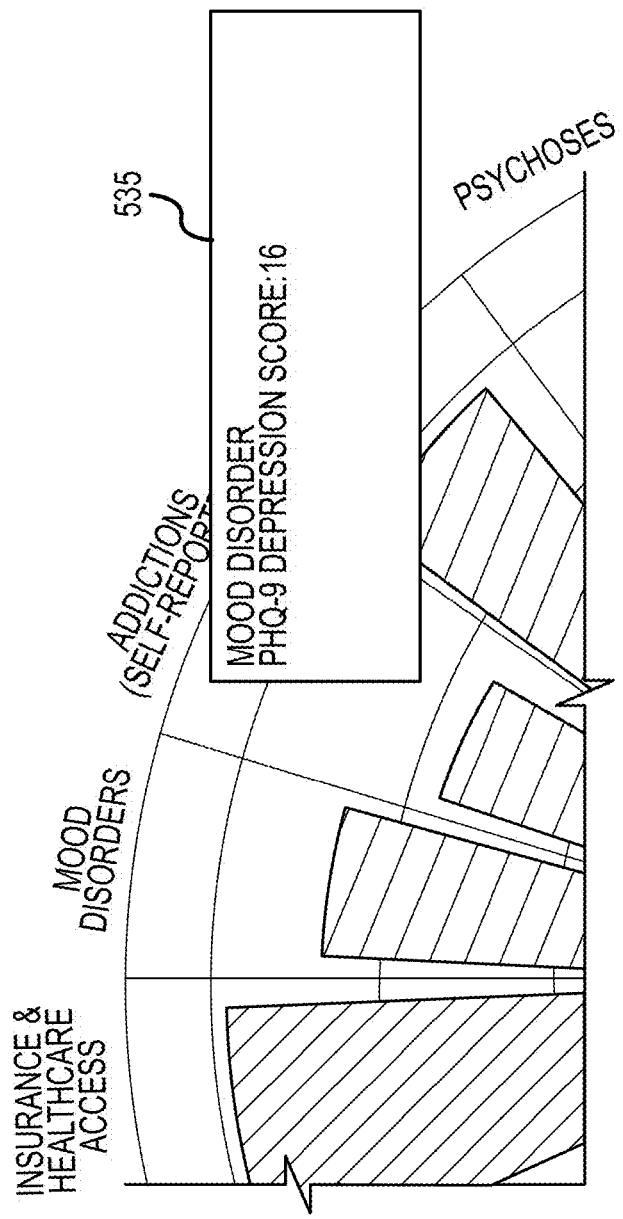

FIGS. 5A and 5B are screenshots illustrating details of an exemplary user interface for providing a unified view of risk factors according to one embodiment of the present disclosure. More specifically, FIG. 5A illustrates an exemplary user interface 470 presenting a visual representation of risk factors as introduced above. According to one embodiment, and as illustrated in this example, the visual representation of risk factors can comprise a pie diagram-like chart comprising a plurality of sectors 505A-505C with each sector 505A-505C representing a different domain. Each domain can be associated with a different type of data and/or data source from which data for various risk factors can be obtained. For example, the sectors 505A-505C can include, but are not limited to, a sector 505A associated with a social domain, a sector 505B associated with a medical domain, and a sector 505C associated with a behavioral domain.

As further illustrated in this example, each sector 505A-505C can further comprise a plurality of categories or "spokes." Each category can represent a different risk factor within the domain. For example, and as illustrated here, the categories for the sector 505A representing the social domain can include, but are not limited to, a housing and food insecurity category 510A, a work and Financial stability category 510B, a transportation access category 510C, a communication and education category 510D, a household and family structure category 510E, a community and environmental factors category 510F, and/or others. The categories for the sector 505B representing the medical domain, as illustrated in this example, can include, but are not limited to, an ED and urgent care category 515A, an inpatient care category 515B, a medical complexity category 515C, an insurance and healthcare access category 515, and/or others. Also as illustrated in this example, a sector 505C representing the behavioral domain can include, but is not limited to, a mood disorders category 520A, an addictions category 520B, a trauma category 520C, a psychoses category 520D, a cognitive or developmental category 520E, an other behavioral category 520F, etc.

It should be noted and understood that the domains and categories represented here are provided by way of example and are not intended to limit the scope of the present disclosure. Rather, in various implementations, the categories, domains, and other features represented in the user interface 470 can vary significantly without departing from the scope of the present disclosure. The domains and categories represented in this example can be used in implementations in which it is desirable to map to some of the emerging SDoH taxonomies, including the SIREN/Gravity Project, HealthyPeople2020, ICD-10 codes, AIRS taxonomy, literature from SDoH thought leaders, and future ONC categories.

The diagnostic process as will be described further below can populate the categories of each sector in a number of different ways. For example, the diagnostic process can be used in a client-reported or user mode in which an individual user of the system can provide details related to any of the categories through a user interface 440 or 445 of the SIE platform 305. Additionally, or alternatively, data can be integrated via data feeds according to and compliant with appropriate industry and regulatory standards regarding data provenance, and user roles and permissions. In some cases, client consent may overrule this siloed approach. Relevant assessments & screeners can additionally, or alternatively, be linked to corresponding categories with scores mapped to severity of need. Examples can include, but are not limited to, Vulnerability Index (VI) & Service Prioritization Decision Assistance Tool (SPDAT) for housing stability, Adverse Childhood Experience (ACE) for family structure and/or childhood trauma, Social Deprivation Index (SDI) for community and environment, Accountable Health Communities Model (AHCM) for scores linked to multiple categories, etc.

As further illustrated in this example, one or more categories can have displayed therein a bar or other indicator 525A-525C of severity. In such cases, the length of the bar or indicator 525A-525C can corresponds to severity and urgency of the client's circumstance and/or needs. For example, categories 510B and 510E include indicators 525A and 525C of a relatively low risk while category 510C includes an indicator 525B of a higher risk. A relatively low risk, such as indicated by indicators 525A and 525C may suggest a circumstance or history that a care team should know about since it may be relevant to their role in providing services even though not necessarily a circumstance within their specialty. A relatively high risk such as indicated by indicator 525B may suggest an action is being taken or should be taken.

According to one embodiment, and as illustrated in this example, the user interface 470 can also include a timeline 530. Since the various risk factors represented by the categories of each sector can be tracked and may change over time, the timeline 530, comprising selectable indications of various dates, can be used to allow a user to view the chart at a selected time. In this way, the user can compare past risk factors to present risk factors to determine if the risk facts are improving and therefore are being adequately addressed, of have stayed the same or even worsened indicating that new and/or additional services are needed.

FIG. 5B illustrates additional details of the user interface 470 presenting a visual representation of risk factors. As illustrated in this example, each category can have a 'flyout' 535 or pop-up that displays what is contributing to any risk indicated in that category. This flyout 535 can be triggered and displayed, for example, by a user manipulating a cursor to hover over or click on the category 520A. The flyout 535 can show details of each item contributing to the indicated risk. According to one embodiment, if the viewing user is not permitted to see a particular category or domain, e.g., because of HIPAA restrictions, user role permissions, and/or other considerations, those categories can be disabled, with messaging that tells the user they do not have the proper permissions to see that data.

Figure 6:
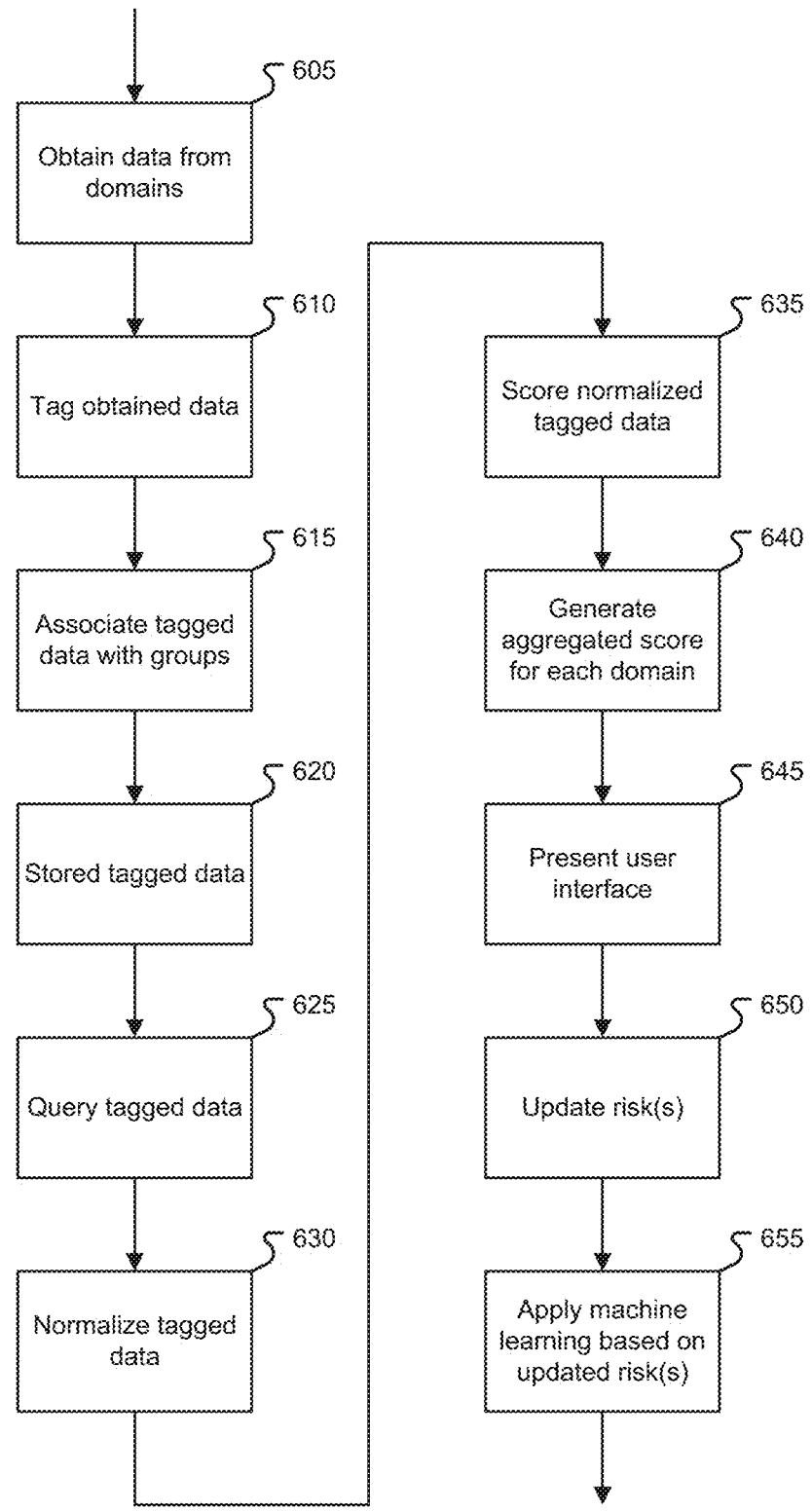
FIG. 6 is a flowchart illustrating and exemplary process for determining risks based on disassociated data from a plurality of domains according to one embodiment of the present disclosure.

FIG. 6 is a flowchart illustrating and exemplary process for determining risks based on disassociated data from a plurality of domains according to one embodiment of the present disclosure. As illustrated in this example, determining risks based on data from a plurality of disassociated domains can comprise obtaining 605, by a processor of a SIE platform as described above, data regarding an individual from one or more systems of each of the plurality of disassociated domains. The data regarding the individual can have format and content specific to the domain from which it is obtained. The obtained data can be tagged 610 based on the domain from which it is obtained and a set of predefined elements for each of the plurality of disassociated domains. The tagged data can be associated 615 with one or more of a plurality of predefined groups. Each group can represent one or more of the plurality of disassociated domains. For example, the plurality of predefined groups, the plurality of disassociated domains, and the set of predefined elements for each of the plurality of disassociated domains can be based on a predefined set of SDoH.

The tagged data can be stored 620 in the format specific to the domain from which it is obtained. Optionally, and in some cases, one or more queries can be performed 625 on the tagged data stored in the format specific to the domain from which it is obtained. The tagged data can also be normalized 630, i.e., to a form standard throughout the SIE platform as described above.

A diagnostic process can be performed on the tagged data and the diagnostic process can identify a risk for the individual in each of the plurality of domains based on the tagged data. Performing the diagnostic process on the tagged data can be performed on the normalized tagged data and can comprise scoring 635 each element of the set of predefined elements for each of the plurality of disassociated domains and generating 640 an aggregated score for each domain of the plurality of disassociated domains based on the scored elements in each domain as described above. A user interface including a visual representation of the identified risk for the individual in each of the plurality of domains in each of the plurality of predefined groups can then be provided 645. The identified risk for the individual in each of the plurality of domains in each of the plurality of predefined groups in the visual representation of the user interface can be based on the scoring of each element of the set of predefined elements for each of the plurality of disassociated domains.

The risk for the individual in each of the plurality of domains can later be updated 650. The update can be based on obtaining 605 new data regarding the individual from at least one of the plurality of disassociated domains, tagging 610 the obtained new data, associating 615 the tagged new data with one or more of the plurality of predefined groups, normalizing 630 the tagged new data, and performing 635 and 640 the diagnostic process on the normalized new data. A machine learning process can then be applied 655 based on the updated risk. The machine learning process can update at least one element of the set of predefined elements for at least one of the plurality of disassociated domains.

The present disclosure, in various aspects, embodiments, and/or configurations, includes components, methods, processes, systems, and/or apparatus substantially as depicted and described herein, including various aspects, embodiments, configurations embodiments, sub-combinations, and/or subsets thereof. Those of skill in the art will understand how to make and use the disclosed aspects, embodiments, and/or configurations after understanding the present disclosure. The present disclosure, in various aspects, embodiments, and/or configurations, includes providing devices and processes in the absence of items not depicted and/or described herein or in various aspects, embodiments, and/or configurations hereof, including in the absence of such items as may have been used in previous devices or processes, e.g., for improving performance, achieving ease and\or reducing cost of implementation.

The foregoing discussion has been presented for purposes of illustration and description. The foregoing is not intended to limit the disclosure to the form or forms disclosed herein. In the foregoing Detailed Description for example, various features of the disclosure are grouped together in one or more aspects, embodiments, and/or configurations for the purpose of streamlining the disclosure. The features of the aspects, embodiments, and/or configurations of the disclosure may be combined in alternate aspects, embodiments, and/or configurations other than those discussed above. This method of disclosure is not to be interpreted as reflecting an intention that the claims require more features than are expressly recited in each claim. Rather, as the following claims reflect, inventive aspects lie in less than all features of a single foregoing disclosed aspect, embodiment, and/or configuration. Thus, the following claims are hereby incorporated into this Detailed Description, with each claim standing on its own as a separate preferred embodiment of the disclosure.

Moreover, though the description has included description of one or more aspects, embodiments, and/or configurations and certain variations and modifications, other variations, combinations, and modifications are within the scope of the disclosure, e.g., as may be within the skill and knowledge of those in the art, after understanding the present disclosure. It is intended to obtain rights which include alternative aspects, embodiments, and/or configurations to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A method for determining risks based on data from a plurality of disassociated domains, the method comprising:
   obtaining, by a processor of a Social Information Exchange (SIE) platform, data regarding an individual from one or more systems of each of the plurality of disassociated domains, the data regarding the individual having format and content specific to the domain from which it is obtained, wherein the plurality of domains comprises a medical domain, a behavioral domain, and a social services domain;
   tagging, by the processor of the SIE platform, the obtained data based on the domain from which it is obtained and a set of predefined elements for each of the plurality of disassociated domains, wherein the set of predefined elements for each disassociated domain comprises indicators of need, risk, or stability within a context of the disassociated domain;
   associating, by the processor of the SIE platform, the tagged data with one or more of a plurality of predefined groups, each group representing one or more of the plurality of disassociated domains, wherein the plurality of groups comprise a personal group, a social group, a behavioral group, and a health group;
   performing, by the processor of the SIE platform, a diagnostic process on the tagged data, wherein the diagnostic process identifies a risk for the individual in each of the plurality of domains based on the tagged data;
   presenting, by the processor of the SIE platform, a user interface including a visual representation of the identified risk for the individual in each of the plurality of domains in each of the plurality of predefined groups, the visual representation comprising a chart, the chart comprising a plurality of sectors, wherein each sector of the plurality of sectors represents a domain of the plurality of domains, wherein each sector comprises a plurality of spokes, each spoke of the plurality of spokes representing a risk category of a plurality of risk categories for the domain, and wherein each spoke includes a visual representation of the identified risk for the individual in the represented risk category.

2. The method of claim 1, wherein the plurality of predefined groups, the plurality of disassociated domains, and the set of predefined elements for each of the plurality of disassociated domains are based on a predefined set of Social Determinants of Health (SDoH).

3. The method of claim 1, further comprising storing, by the processor of the SIE platform, the tagged data in the format specific to the domain from which it is obtained.

4. The method of claim 3, further comprising executing, by the processor of the SIE platform, one or more queries on the tagged data stored in the format specific to the domain from which it is obtained.

5. The method of claim 3, further comprising normalizing, by the processor of the SIE platform, the tagged data.

6. The method of claim 5, wherein performing the diagnostic process on the tagged data is performed on the normalized tagged data and comprises:
   scoring each element of the set of predefined elements for each of the plurality of disassociated domains;
   generating an aggregated score for each domain of the plurality of disassociated domains based on the scored elements in each domain, wherein the identified risk for the individual in each of the plurality of domains in each of the plurality of predefined groups in the visual representation of the user interface is based on the scoring of each element of the set of predefined elements for each of the plurality of disassociated domains.

7. The method of claim 1, further comprising:
   updating, by the processor of the SIE platform, the risk for the individual in each of the plurality of domains based obtaining new data regarding the individual from at least one of the plurality of disassociated domains, tagging the obtained new data, associating the tagged new data with one or more of the plurality of predefined groups, normalizing the tagged new data, and performing the diagnostic process on the normalized new data; and
   applying, by the processor of the SIE platform, a machine learning process based on the updated risk, wherein the machine learning process updates at least one element of the set of predefined elements for at least one of the plurality of disassociated domains.

8. A system comprising:
   a processor; and
   a memory coupled with and readable by the processor and storing therein a set of instructions which, when executed by the processor, causes the processor to determine risks based on data from a plurality of disassociated domains by:
      obtaining data regarding an individual from one or more systems of each of the plurality of disassociated domains, the data regarding the individual having format and content specific to the domain from which it is obtained, wherein the plurality of domains comprises a medical domain, a behavioral domain, and a social services domain;
      tagging the obtained data based on the domain from which it is obtained and a set of predefined elements for each of the plurality of disassociated domains, wherein the set of predefined elements for each disassociated domain comprises indicators of need, risk, or stability within a context of the disassociated domain;
      associating the tagged data with one or more of a plurality of predefined groups, each group representing one or more of the plurality of disassociated domains, wherein the plurality of groups comprise a personal group, a social group, a behavioral group, and a health group;
      performing a diagnostic process on the tagged data, wherein the diagnostic process identifies a risk for the individual in each of the plurality of domains based on the tagged data;

presenting a user interface including a visual representation of the identified risk for the individual in each of the plurality of domains in each of the plurality of predefined groups, the visual representation comprising a chart, the chart comprising a plurality of sectors, wherein each sector of the plurality of sectors represents a domain of the plurality of domains, wherein each sector comprises a plurality of spokes, each spoke of the plurality of spokes representing a risk category of a plurality of risk categories for the domain, and wherein each spoke includes a visual representation of the identified risk for the individual in the represented risk category.

9. The system of claim 8, wherein the plurality of predefined groups, the plurality of disassociated domains, and the set of predefined elements for each of the plurality of disassociated domains are based on a predefined set of Social Determinants of Health (SDoH).

10. The system of claim 8, wherein the instructions further cause the processor to store the tagged data in the format specific to the domain from which it is obtained.

11. The system of claim 10, wherein the instructions further cause the processor to execute one or more queries on the tagged data stored in the format specific to the domain from which it is obtained.

12. The system of claim 10, wherein the instructions further cause the processor to normalize the tagged data.

13. The system of claim 12, wherein performing the diagnostic process on the tagged data is performed on the normalized tagged data and comprises:
  scoring each element of the set of predefined elements for each of the plurality of disassociated domains;
  generating an aggregated score for each domain of the plurality of disassociated domains based on the scored elements in each domain, wherein the identified risk for the individual in each of the plurality of domains in each of the plurality of predefined groups in the visual representation of the user interface is based on the scoring of each element of the set of predefined elements for each of the plurality of disassociated domains.

14. The system of claim 8, wherein the instructions further cause the processor to:
  update the risk for the individual in each of the plurality of domains based obtaining new data regarding the individual from at least one of the plurality of disassociated domains, tagging the obtained new data, associating the tagged new data with one or more of the plurality of predefined groups, normalizing the tagged new data, and performing the diagnostic process on the normalized new data; and
  apply a machine learning process based on the updated risk, wherein the machine learning process updates at least one element of the set of predefined elements for at least one of the plurality of disassociated domains.

15. A non-transitory, computer-readable medium comprising a set of instructions stored therein which, when executed by a processor, causes the processor to determine risks based on data from a plurality of disassociated domains by:
  obtaining data regarding an individual from one or more systems of each of the plurality of disassociated domains, the data regarding the individual having format and content specific to the domain from which it is obtained, wherein the plurality of domains comprises a medical domain, a behavioral domain, and a social services domain;
  tagging the obtained data based on the domain from which it is obtained and a set of predefined elements for each of the plurality of disassociated domains, wherein the set of predefined elements for each disassociated domain comprises indicators of need, risk, or stability within a context of the disassociated domain;
  associating the tagged data with one or more of a plurality of predefined groups, each group representing one or more of the plurality of disassociated domains, wherein the plurality of groups comprise a personal group, a social group, a behavioral group, and a health group;
  performing a diagnostic process on the tagged data, wherein the diagnostic process identifies a risk for the individual in each of the plurality of domains based on the tagged data;
  presenting a user interface including a visual representation of the identified risk for the individual in each of the plurality of domains in each of the plurality of predefined groups, the visual representation comprising a chart, the chart comprising a plurality of sectors, wherein each sector of the plurality of sectors represents a domain of the plurality of domains, wherein each sector comprises a plurality of spokes, each spoke of the plurality of spokes representing a risk category of a plurality of risk categories for the domain, and wherein each spoke includes a visual representation of the identified risk for the individual in the represented risk category.

16. The non-transitory, computer-readable medium of claim 15, wherein the plurality of predefined groups, the plurality of disassociated domains, and the set of predefined elements for each of the plurality of disassociated domains are based on a predefined set of Social Determinants of Health (SDoH).

17. The non-transitory, computer-readable medium of claim 15, wherein the instructions further cause the processor to store the tagged data in the format specific to the domain from which it is obtained and execute one or more queries on the tagged data stored in the format specific to the domain from which it is obtained.

18. The non-transitory, computer-readable medium of claim 17, wherein the instructions further cause the processor to normalize the tagged data.

19. The non-transitory, computer-readable medium of claim 18, wherein performing the diagnostic process on the tagged data is performed on the normalized tagged data and comprises:
  scoring each element of the set of predefined elements for each of the plurality of disassociated domains;
  generating an aggregated score for each domain of the plurality of disassociated domains based on the scored elements in each domain, wherein the identified risk for the individual in each of the plurality of domains in each of the plurality of predefined groups in the visual representation of the user interface is based on the scoring of each element of the set of predefined elements for each of the plurality of disassociated domains.

20. The non-transitory, computer-readable medium of claim 15, wherein the instructions further cause the processor to:
  update the risk for the individual in each of the plurality of domains based obtaining new data regarding the individual from at least one of the plurality of disassociated domains, tagging the obtained new data, associating the tagged new data with one or more of the plurality of predefined groups, normalizing the tagged new data, and performing the diagnostic process on the normalized new data; and apply a machine learning process based on the updated risk, wherein the machine learning process updates at least one element of the set of predefined elements for at least one of the plurality of disassociated domains.

\* \* \* \* \*